Fig. 6.

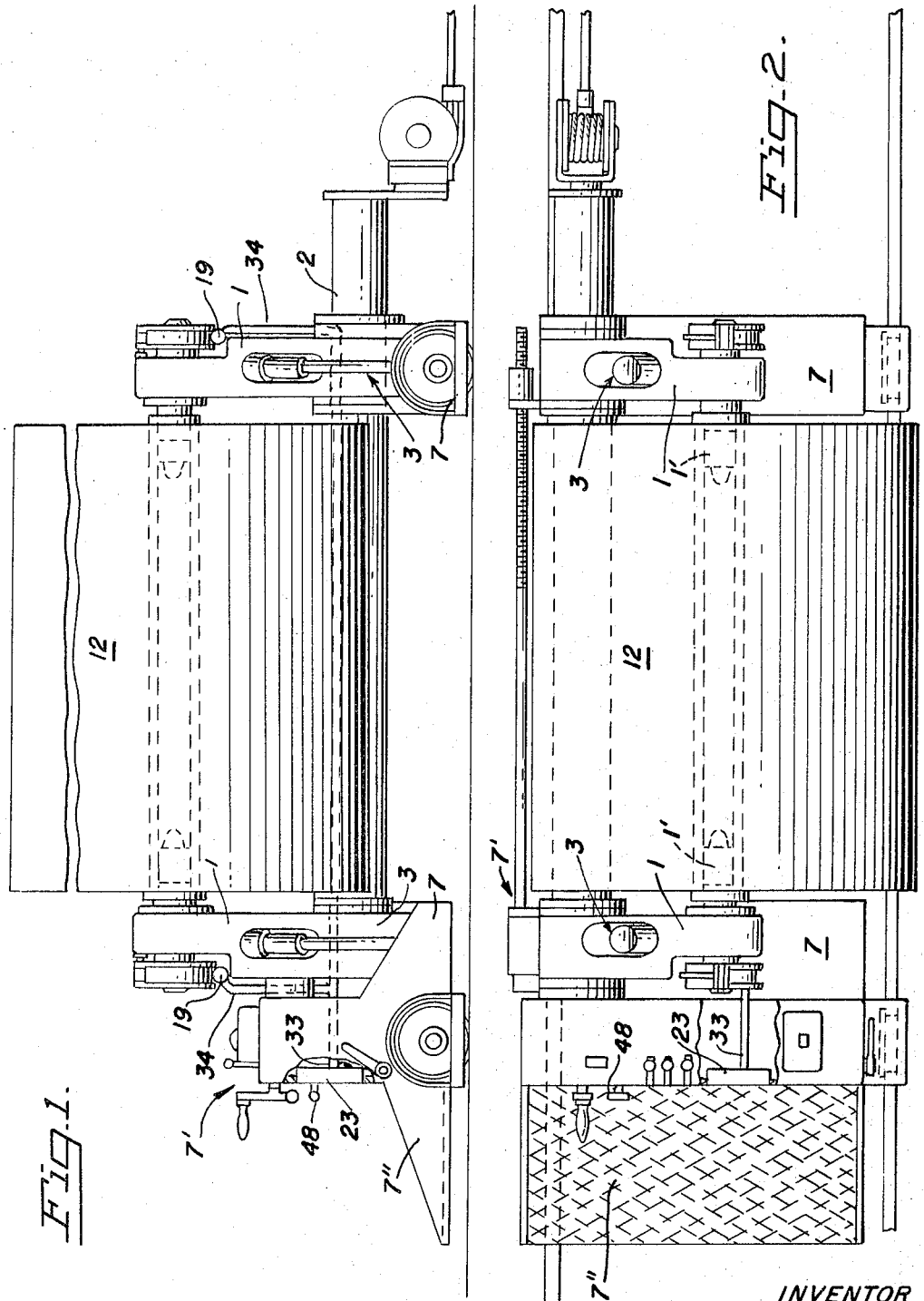

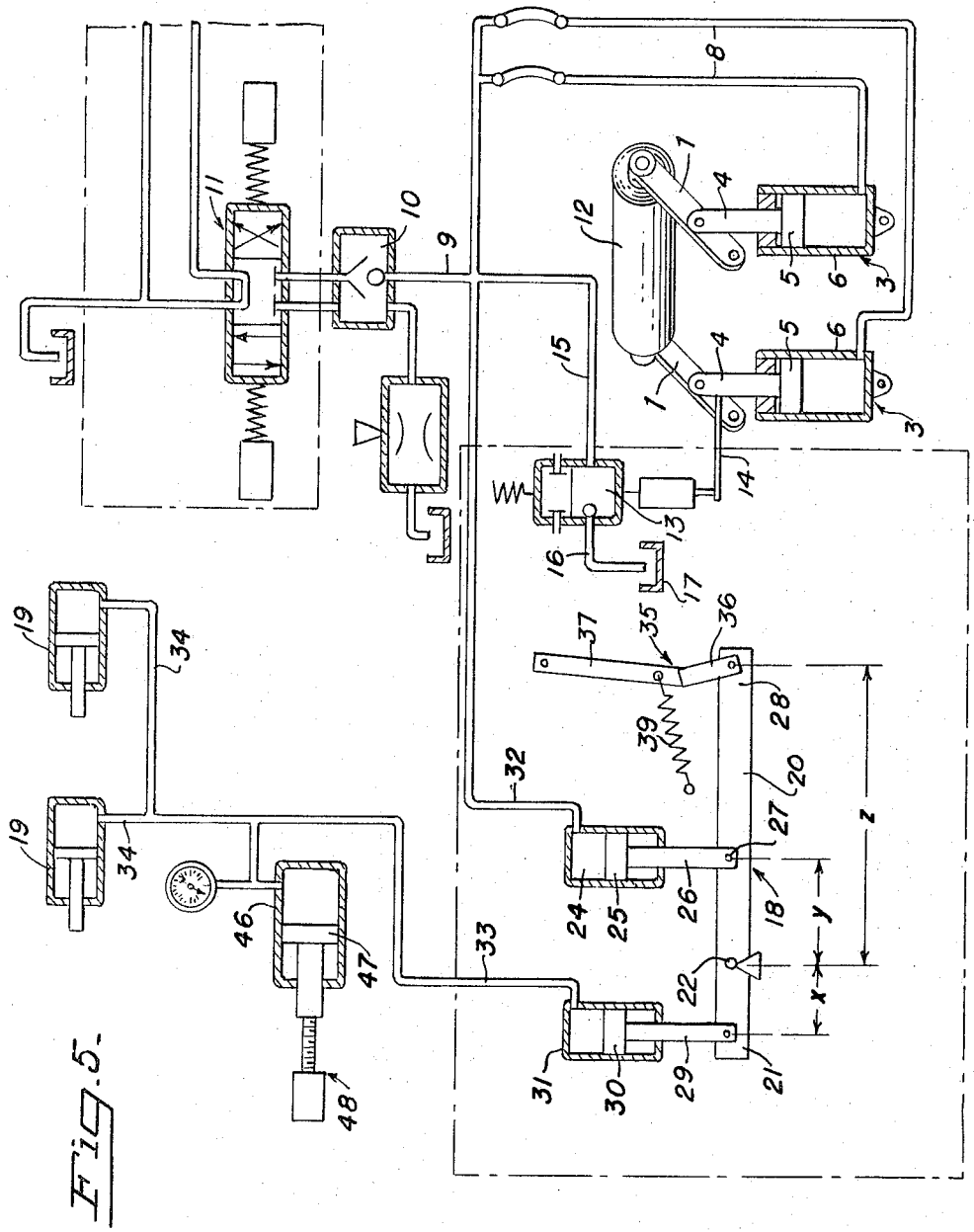

TYPICAL FACTORS FOR RESULTANT BRAKE PRESSURE

| | REGULATOR CYLINDER (31) 1" DIA, .7854 SQ. IN. AREA DISTANCE FROM LEVER FULCRUM (22) 1.5" | | SENSOR CYLINDER (24) 1.5" DIA, 1.767 SQ. IN. AREA DISTANCE FROM LEVER FULCRUM (22) 1.90" | | | | | BALANCING OR COUNTERTORQUE SPRING (39) WITH 0 INITIAL TENSION 100# PULL 2 3/8" LENGTH OF LEVER (20) 7 1/2" | | | |
|---|---|---|---|---|---|---|---|---|---|---|---|
| 1 | 2 | 3 | 4 | 5 | 6 | 7 | 8 | 9 | 10 | 11 | 12 |
| BRAKE PRESSURE | TRAVEL OF PISTON | TORQUE (T₁) IN LBS. | DIAMETER OF WEB ROLL | WEIGHT OF WEB ROLL | PRESSURE IN CYLINDER (24) | TORQUE IN. LBS. | REQUIRED TENSION (T₃=(T₂-T₁)) | REQUIRED TENSION OF END OF LEVER (20) (T₃/7.5) | THEORETICAL TRAVEL OF END OF LEVER (20) | ACTUAL TRAVEL OF END OF LEVER (20) | ACTUAL RESULTANT BRAKE PRESSURE PRODUCED |
| 600 | .580 | 707 | 58" | 6600 | 600# | 2014 | 1307 | 174 | 2.90 | 2.97 | 600 |
| 500 | .546 | 589 | 49" | 4700 | 434# | 1457 | 868 | THEO 115 / ACTUAL 110 | 2.73 | 2.80 | 540 |
| 400 | .505 | 471 | 40" | 3122 | 297# | 997 | 526 | 70 / 68 | 2.52 | 2.68 | 406 |
| 300 | .452 | 353 | 31" | 1862 | 187# | 627 | 274 | 36 / 38 | 2.26 | 2.25 | 287 |
| 200 | .380 | 236 | 22" | 923 | 105# | 353 | 117 | 16 / 22 | 1.90 | 1.70 | 160 |
| 100 | .258 | 118 | 13" | 301 | 51# | 171 | 53 | 7 / 10 | 1.29 | 1.17 | 85 |
| 50 | .168 | 59 | 8.5" | 110 | 34# | 114 | 55 | 7 / 7 | .84 | .84 | 50 |
| 0 | 0 | 0 | 4" (4" CORE) | 0 | 25# (RESIDUAL WEIGHT) | 84 | 84 | 11 / 5 | 0 | .69 | 35 |

INVENTOR
MERRILL D. MARTIN
BY George B. White
ATTORNEY

United States Patent Office 3,306,551
Patented Feb. 28, 1967

3,306,551
TENSION DEVICE FOR AUTOMATIC BRAKE
CONTROL FOR WEB ROLL STANDS
Merrill D. Martin, 2 Mall Court, Oakland, Calif. 94611
Filed July 21, 1965, Ser. No. 473,786
10 Claims. (Cl. 242—75.46)

This invention relates to a tension device for automatic brake control for web roll stands and the like.

In web roll stands, as the processing machine unwinds the web roll, the diameter as well as the weight of the roll decreases. There is a brake provided at the chucks of the web roll stand to reduce the tension to overcome the inertia of the web roll and to keep the paper or web under a predetermined tension as it is unwound. In previous machines the operator applied at the beginning of the operation a given pressure to the brakes which frequently resulted in excessive braking as the weight and diameter of the web roll decreased. In some instances the operator of the machine returned to readjust the brake pressure, but all of this operation was more or less guess work. There were some devices provided which were elaborate and expensive for automatically varying the pressure on the brakes, but none of them had the simple compensation for the combined reduction of weight as well as diameter for accurately controlling the brake pressure according to the combined effect of the decreasing roll diameter and the decrease of the weight of the roll.

It is the primary object of this invention to provide an automatic brake control in which the hydraulic brake pressure is controlled by a hydraulic sensor which in turn senses the variation of hydraulic pressure in the hydraulic raising cylinders on which the arms supporting the paper roll are supported and to provide a predetermined counterbalance for the action of the sensor to compensate for variation of web roll diameter.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a side view of the hydraulically actuated portable unwind stand.

FIG. 2 is top plan view of the unwind stand.

FIG. 5 is a hydraulic flow diagram showing the connection of the sensor device between the hydraulic raising cylinders of the unwind stand and the brake cylinder.

FIG. 6 is a chart of typical functions and factors determining proper brake pressure for constant tangential tension in unwinding the web roll.

Figure 4:
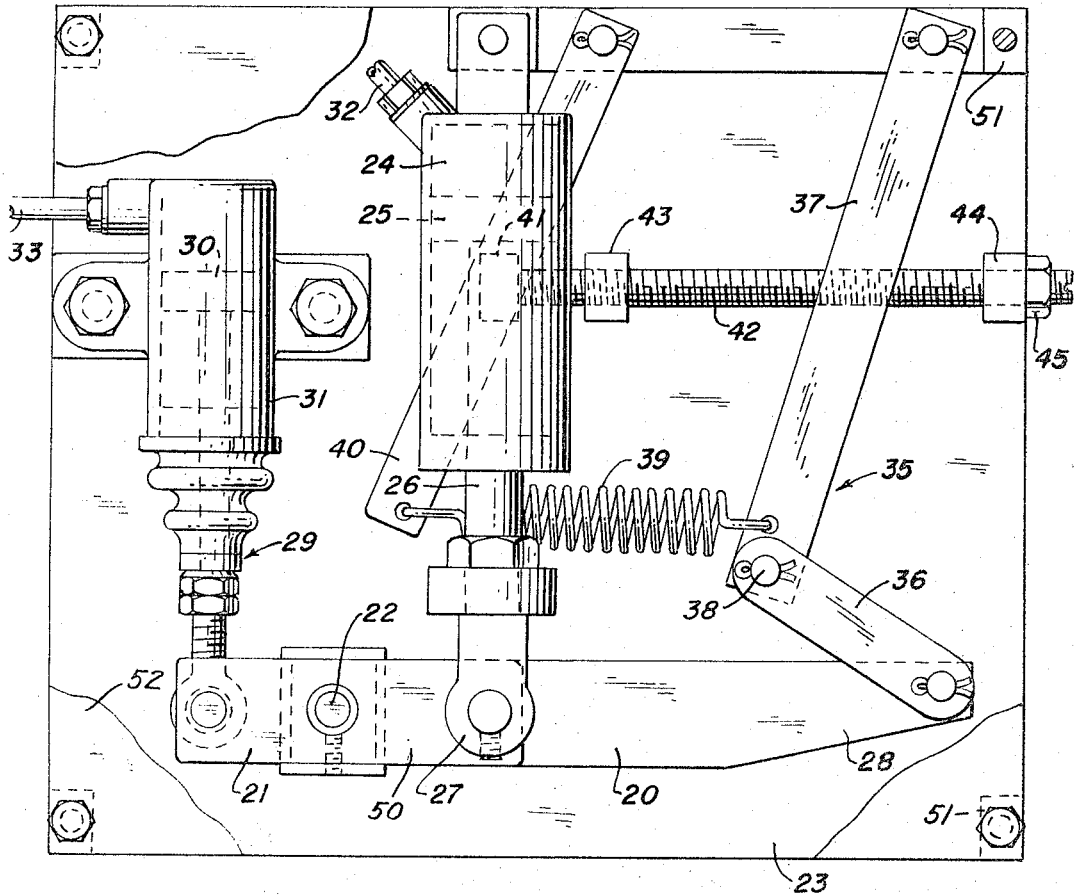
FIG. 4 is a front view of the sensor and brake tension regulator with cover removed from the housing.

In unwind stands, for instance on type shown in United States Letters Patent No. 3,276,711, issued to Merrill D. Martin on October 4, 1966, for Unwind Stand for Web Rolls, the web roll lifting and supporting arms 1 are fulcrumed on pivot 2 and rest on hydraulic raising devices 3. In this illustration and as shown in the flow diagram in FIG. 5, the arms 1 are supported on the piston rods 4 of pistons 5 working in cylinders 6, which cylinders 6 are in turn pivoted on the base 7 of the carriage 7' of the unwind stand, which has at one end a cab 7''. Each arm 1 has in its free end a rotatable spindle 1'. These spindles 1' extend into the ends of the tubular central part of the web roll 12 so as to rotatably support the web roll 12. The pivot 2 consists of a shaft which extends along one side of the entire carriage 7' spaced above the base 7.

Intake conduit 8 leads to the intake end of each cylinder 6 and these intake conduits 8 are connected by a conduit 9 through the usual check valve 10 to the manually operated main valve 11.

When the main valve 11 is opened to the conduit 9 then fluid under pressure flows through the intake conduits 8 into the cylinder 6 and pushes the pistons 5 for raising and holding the arms 1 in suitable position to support a web roll 12 in operative relation to the usual processing machine not shown.

In order to prevent the building of excessive pressure in the cylinders 6 and in the intake conduits 8, a stroke limiting valve 13 is connected by a finger 14 to one of the piston rods 4 so that after a predetermined stroke of the piston rod 4, the stroke limiting valve 13 is opened by the action of the finger 14. The stroke limiting valve 13 is connected by a by-pass conduit 15 to the conduit 9, and by a discharge conduit 16 to a reservoir 17 so that when the finger 14 opens the normally closed stroke limiting valve 13, liquid is bypassed from the conduit 9 at a rate to limit the pressure in the intake conduits 8 and in the cylinders 6.

The sensor device 18 is inter-connected between the brake cylinders 19 and the intake conduits 8 so as to transmit variation of hydraulic pressure in the cylinders and in the intake conduits 8 to the brake cylinders 19.

The sensor device 18 includes a lever 20 pivoted near one end 21 thereof on a pivot 22, which latter is supported on a plate 23 suitably mounted on the carriage 7' of the unwind stand. On the plate 23 there is also pivotally mounted an end of a sensor cylinder 24. A sensor pistor 25 works in the sensor cylinder 24. The piston rod 26 of the sensor piston 25 is suitably fulcrumed by a sensor pivot 27 to the lever 20 nearer to the lever pivot 22 than to the free end 28 of the lever 20.

To the lever end 21 is pivoted the piston rod 29 of a regulator piston 30 working in a regulator cylinder 31. To the top of the sensor cylinder 24 is connected a sensor conduit 32 which connects to the intake conduits 8 or to conduit 9. The outlet end of the regulator cylinder 31 is connected by a regulator conduit 33 and its branches 34 to the intake ends of the brake cylinders 19.

All the conduits with fluid circuits herein described are flexible so as to permit relative movement of the respective parts of the unwind stand.

In this manner, as the pressure decreases in the raising cylinders 6 according to the weight of the paper roll or web roll 12, the pressure in the sensor cylinder 24 is also decreased permitting the sensor piston 25 to rise, thereby lowering the other end 21 of the lever 20 and pulling down the regulator piston 30, thereby relieving part of the pressure in the braking cylinders 19.

The weight of the web roll and its diameter change together as the web is unwound, hence the regulation of brake pressure is compensated to the combined change of the web roll. An adjustable balancing device 35 is pivoted upon the free end of the lever 20. This balancing device 35 in the present illustration includes toggle links 36 and 37, pivoted to one another. Toggle link 36 is pivoted to the free end of the lever 20 while the longer toggle link 37 is pivoted to the plate 23 in such a manner that the toggle pivot 38 of the links 36 and 37 is normally offset toward the sensor cylinder 24. A sensor coil spring 39 has one end hooked into the longer toggle link 37 above or near the toggle pivot 38, and has its other end hooked into the lower end of a spring link 40 which latter is pivoted at its other end to the plate 23 in substantially horizontal registry with the top pivot of the longer toggle link 37.

On the spring link 40 is a lug 41 in which is journalled the end of an adjusting screw 42. This adjusting screw 42 is guided in a lug 43 on the plate 23 and is threaded into a threaded lug 44 near the edge of the plate 23. The pull of the coil spring 39 presses the link lug 41 against the end of the adjusting screw 42 and thus predetermines the tension of the sensor coil spring 39. A nut 45 on the outer end of the adjusting screw 42 bears against the threaded lug 44 to lock the adjusting screw 42 in the adjusted position.

The adjusted pull exerted by the sensor spring 39 holds the toggle pivot 38 in a pre-determined position and thus holds the free end of the lever 20 in an initial position wherein the pistons 25 and 30 respectively in the sensor cylinder 24 and in the regulator cylinder 31 are substantially at the same level, the cylinders being substantially equal. This is an initially balanced attitude with predetermined resistance corresponding to the change of weight of the web roll as it is unwound.

A brake master cylinder 46, indicated on the hydraulic flow diagram in FIG. 5, has its piston 47 adjusted by a suitable manual adjusting device 48 to a normal initial brake pressure in the brake cylinders 19. In the herein illustrative embodiment and for convenience of assembly the lever 20 has an integral offset fulcrum hub 49 on which latter is an integral cross arm 50 parallel with the lever 20. The piston rod 29 is pivoted on the end of the cross arm beyond the fulcrum 22 which forms the lever end 21. The pivot 27 of the piston rod 26 is pivoted on the other end of the cross arm 50 to locate the sensor pivot 27 between the fulcrum 22 and the free end 28 of the lever 20.

Figure 3:
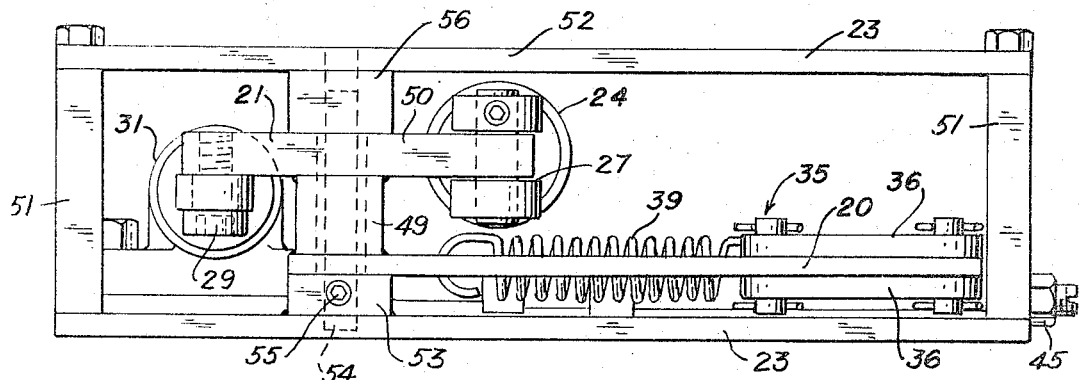
FIG. 3 is a bottom end view of the tension regulator with housing partly removed.

In order to securely cover the assembly, the plate 23 has corner posts 51 and a cover plate 52 is detachably mounted on the posts 51, as shown in FIG. 3. A boss 53 on the plate 23 abuts against lever 20 at its fulcrum 22 and has a fulcrum shaft 54 secured therein, for instance by a set screw 55. Another boss 56 extends from the cover 52 and engages the top end of the shaft 54 and bears against the top of the cross arm 50 so that the fulcrum of the lever 20 is rotatably held between the bosses 53 and 56.

In operation after the web roll is raised the manual valve is closed and the full web roll 12 is supported on the cylinders 6 and the full weight is exerted on the liquid therein in a closed hydraulic circuit so that this pressure presses down the sensor piston 25 in the sensor cylinder 24 so far as it is permitted by the adjusted tension of the coil spring 39. In other words, the movement of the lever 20 is a combined result of the increased pressure on the sensor piston 25 and of the pre-adjusted tension of the sensor spring 39.

This resultant movement or force upon the lever 20 correspondingly raises the other end 21 of the lever 20 and thereby pushes the regulator piston 30 into the regulator cylinder 31, forcing fluid under pressure in the closed brake circuit through the regulator conduit 33 and its branches 34 into the brake cylinders 19 for applying the brakes on the spindles or chucks of the unwind stand. As the web roll 12 is unwound its diameter as well as its weight decreases and the decreased pressure exerted in the raising cylinders 6 relieves corresponding pressure in the sensor cylinder 24 and the combined effect of this decrease of pressure in the sensor cylinder 24 and of the pull of the pre-adjusted sensor spring 39 brake the toggle link further so as to raise the free end of the lever 20 thereby to lower the regulator piston 30 and correspondingly relieve some of the pressure in the brake cylinders 19. In this manner the brake action on the spindle or chucks in the arms 1 of the unwind stand is automatically regulated according to the diameter and weight of the web roll 12, maintaining constant tension on the web as it is unwound by the processing machine.

It is important that tangential tension or pull on the web such as paper of the web roll be substantially constant. Therefore the pressure exerted by the weight of the web roll on the raising cylinders 6 as applied to the sensor cylinder 24 is counteracted so as to modify the resultant torque exerted on the lever 20 substantially in accordance with the decrease of the web roll diameter corresponding to the decrease of weight as the paper is unwound from the web roll. The weight of the average web roll is substantially proportional to the square of the diameter of the web roll, therefore to compensate for the change of this square function, the action of the balancing or counter torque spring 39 is modified by exerting its pull through the toggle link 36. The proportions of the toggle links 36 and 37 are such that the resultant force counteracts the torque exerted by the piston of the sensor cylinder 24 on the lever 20 and reduces the ultimate resultant torque to the proper brake pressure thereby to produce the substantially constant tangential tension on the material unwound from the web roll throughout the unwinding operation.

In FIG. 6 is shown a chart tabulating typical factors and functions to obtain such substantially constant tangential tension.

Columns 1, 2 and 3 of FIG. 6 pertain to the regulator cylinder 31 and its piston 30 of the arrangement and size specified in the heading of these columns.

In column 1 of FIG. 6 are tabulated the theoretical decreasing brake pressures from 600 pounds to 0 pound. The initial brake pressure of this column is preset manually through the master cylinder 46 according to the width and full weight and material of the web roll. Such setting for a given type of web roll is predetermined by experience as to desirable tangential tension or resistance to pull for efficient unwinding. As long as the same type of web roll is handled the initial setting remains the same.

Column 2 of FIG. 6 tabulates the travel of the regulator piston 30, in a regulator cylinder 31 of the size specified in the chart for producing the corresponding brake pressure.

Column 3 of FIG. 6 tabulates the torque in inch pounds needed to move the regulator piston 30 to exert the given pressures.

Columns 4, 5, 6 and 7 of FIG. 6 tabulate the functions pertaining to the sensor cylinder 24 as specified in the heading above these columns.

Column 4 of FIG. 6 tabulates the diameters of the web roll as it is unwound from 58" diameter down.

Column 5 tabulates the weight of the web roll at the different diameters.

Column 6 tabulates the pressures in this sensor cylinder 24 at the weights of the decreasing web roll tabulated in column 5.

Column 7 tabulates the torque in inch pounds exerted by the sensor piston 25 on the lever 20.

Columns 8, 9, 10, 11 and 12 of FIG. 6 pertain to the functions in the torque modifying action of the balancing device 35.

Column 8 of FIG. 6 tabulates the required counter torque to reduce the torque of column 7 to the torque of column 3 at the various tabulated weights and pressures.

Column 9 of FIG. 6 tabulates the required tension to be exerted on the free end of the lever 20 to produce the countertorque action tabulated in column 8.

Columns 10 and 11 of FIG. 6 tabulate respectively the theoretical travel and actual travel of the free end of the lever 20 for the desired travel of the regulator piston 30 as tabulated in column 2.

Column 12 of FIG. 6 tabulates the actual brake pressure achieved by the other tabulated factors and functions, which in practice resulted in substantially constant tangential tension or resistance to pull of a web roll of the type described during the entire unwinding operation.

I claim:
1. In an unwind stand for carrying and supporting a web roll, having a hollow spool,
  (a) a carriage including
  (b) a cab at one end thereof,
  (c) a pair of spaced loading arms on the carriage spaced from said cab,
  (d) rotatable means on the loading arms to engage opposite ends of said spool for supporting said web roll,
  (e) means for adjusting said loading arms for clamping said hollow spool,
  (f) fluid actuated means to raise said web roll and to support said web roll in raised position.
  (g) a control valve to supply fluid under pressure to said fluid actuated means,
  (h) fluid actuated brake means on said rotatable spool engaging means to apply a predetermined resistance to the rotation of said rotatable means thereby to determine the tension on the web during the unwinding of the web roll,
  (i) means interconnected between said fluid actuated means and said brake means, responsive to the fluid pressure exerted in said fluid actuated support means by said web roll, to vary the said brake resistance in accordance with the decrease of the weight and diameter of the roll during unwinding thereby to maintain substantially constant tension on the web during the unwinding of said web roll.

2. The invention defined in claim 1, and
  (j) said inter-connected means including a pressure sensor device operated by the fluid pressure in said fluid actuated support means,
  (k) a regulator device for varying the fluid pressure in said fluid actuated brake means,
  (l) and a balance connection between said sensor device and said brake regulator device to transmit force from said sensor device to said regulator device substantially in accordance with the variation of fluid pressure in said fluid actuated support means modified to compensate for the decrease of diameter corresponding to the decrease of weight of the web roll during unwinding.

3. The invention defined in claim 1, and
  (j) said interconnected means including
  (k) a fluid operated sensor device,
  (l) a fluid operated brake regulator device,
  (m) a torque exerting element connecting said sensor device to said regulator device,
  (n) a closed fluid circuit connecting said fluid actuated web roll support means to said sensor device to actuate said sensor device according to the variation of pressure in said closed fluid circuit in response to the variation of the weight of said web roll during the unwinding of said web roll,
  (o) a closed fluid circuit between said regulator device and said fluid actuated brakes to regulate the brake pressure in accordance with the force transmitted from said sensor device to said regulator device,
  (p) countertorque means for applying a force to said interconnected means to modify the torque exerted by said sensor means substantially to compensate for the reduction of diameter of said web roll during unwinding.

4. An automatic brake control for an unwind stand for web rolls, having rotatable elements to clamp the center of the web roll and hydraulically actuated brakes for said rotatable elements to produce a tension on the web unwound from said web roll, comprising
  (a) hydraulic means to support said rotatable elements and said web roll in unwinding position,
  (b) a closed hydraulic circuit to hold said hydraulic means in said web roll supporting position,
  (c) a hydraulic sensor device inter-connected in said closed hydraulic circuit to form a closed sensor circuit responsive to variation of the weight of said web roll during unwinding,
  (d) a closed hydraulic brake circuit for said brakes,
  (e) adjustable means to pre-determine an initial brake pressure in said closed hydraulic brake circuit,
  (f) a pressure regulator inter-connected in said closed hydraulic brake circuit,
  (g) transmission means to transmit regulating force from the sensor device to said pressure regulator substantially in accordance with the variation of pressure in said closed hydraulic tension circuit produced by the variation of weight of the web roll during unwinding,
  (h) and force modifying countertorque means for applying such counter force to said transmitting means as to modify the force applied to said brake pressure regulator substantially in accordance with the variation of diameter of the web roll caused by the unwinding of the web roll.

5. The invention defined in claim 4, and
  (i) said transmission means between said sensor device and said regulator device including a torque element for transmitting leverage exerted by the movement of the sensor device to said regulator device,
  (j) and said force modifying means including a countertorque device connected to said torque element to counteract the torque exerted by said sensor device in a predetermined ratio corresponding substantially to the ratio between the weight and diameter of the web roll during unwinding.

6. In an automatic tension device for web roll being unwound from a web roll supported by rotatable clamping elements on raising arms, the combination with
  (a) hydraulic jacks for raising said arms,
  (b) valve means to close the fluid circuit of said jacks thereby to hold said jacks in web roll supporting position during the unwinding of the web from the web roll,
  (c) a sensor cylinder interconnected in said closed fluid circuit of said jacks,
  (d) a sensor member in said sensor cylinder movable in response to variation of pressure in said closed fluid circuit of said jack, caused by the weight of said web roll during unwinding,
  (e) hydraulic brakes to apply resistance to the rotation of said rotatable clamp elements and to the unwinding of said web roll thereby to hold the web under tension,
  (f) a closed fluid brake circuit for applying initial braking force to said hydraulic brakes,
  (g) a regulator cylinder interconnected in said fluid brake circuit,
  (h) a regulator member movable in said regulator cylinder to vary the braking force in said fluid brake circuit,
  (i) a fulcrumed lever connected to said sensor member and to said regulator member to transmit force of movement of said sensor member to said regulator member,
  (j) and counter balance means connected to said lever so as to counteract a portion of the force exerted by the movement of said sensor member in proportion to the reduction of diameter of said web roll during unwinding.

7. The invention defined in claim 6, and
  (k) adjusting means for adjusting the initial braking force in said fluid brake circuit.

8. The invention defined in claim 6, and
(k) a limit by pass device operated by said hydraulic jacks to by pass fluid from said closed fluid circuit of said jacks after a predetermined stroke, thereby to limit the rising of said jacks.

9. The invention defined in claim 6, and
(k) said counter balance means including toggle links having an end of one link connected to said lever and the end of the other link fixed so as to brake the toggle joint to one side of dead center,
(l) a coil spring having one end held fixed and its other end connected to the toggle links so as to urge the bending of the toggle joint thereby to exert countertorque on said lever oppositely to the direction of force exerted on said lever by said sensor member,
(m) and means to adjust the initial tension of said spring substantially in accordance with the ratio of the diameter of said web roll to its weight.

10. The invention defined in claim 9, and
(n) the fulcrum of said lever being located between said sensor member and said regulator member.

References Cited by the Examiner
UNITED STATES PATENTS

| | | | |
|---|---|---|---|
| 1,383,953 | 7/1921 | James | 242—75.46 |
| 2,780,419 | 2/1957 | Hall | 242—75.46 X |

FRANK J. COHEN, *Primary Examiner.*

N. L. MINTZ, *Assistant Examiner.*